Sept. 22, 1942.     F. BRECKENRIDGE     2,296,266
LIQUID MIXING DEVICE
Filed Nov. 22, 1940

WITNESSES:
R. G. Ridge
E. H. Lutz

INVENTOR
FRANK BRECKENRIDGE.
BY W. A. Steiger
ATTORNEY

Patented Sept. 22, 1942

2,296,266

UNITED STATES PATENT OFFICE 2,296,266

LIQUID MIXING DEVICE

Frank Breckenridge, Mansfield, Ohio, assignor to Westinghouse Electric & Manufacturing Company, East Pittsburgh, Pa., a corporation of Pennsylvania Application November 22, 1940, Serial No. 366,642

4 Claims. (Cl. 236—12)

My invention relates to thermostatically-controlled liquid mixing devices and has for an object to provide improved apparatus of this kind.

It is a further object of the invention to provide an improved device of the character set forth which may be constructed as a unit and wherein three different temperatures of the liquid discharged therefrom may be obtained for a single adjustment of the thermostat element.

A further object of the invention is to provide an improved liquid proportioning mechanism for application to a washing machine, wherein different temperatures of wash and rinse water admitted to the washing machine may be obtained without adjusting the thermostat controlling the proportioning of hot and cold liquid admitted to and mixed within the mechanism and wherein the differential between the temperatures of said wash and rinse water varies for different adjustment of the thermostat.

Figure 1:
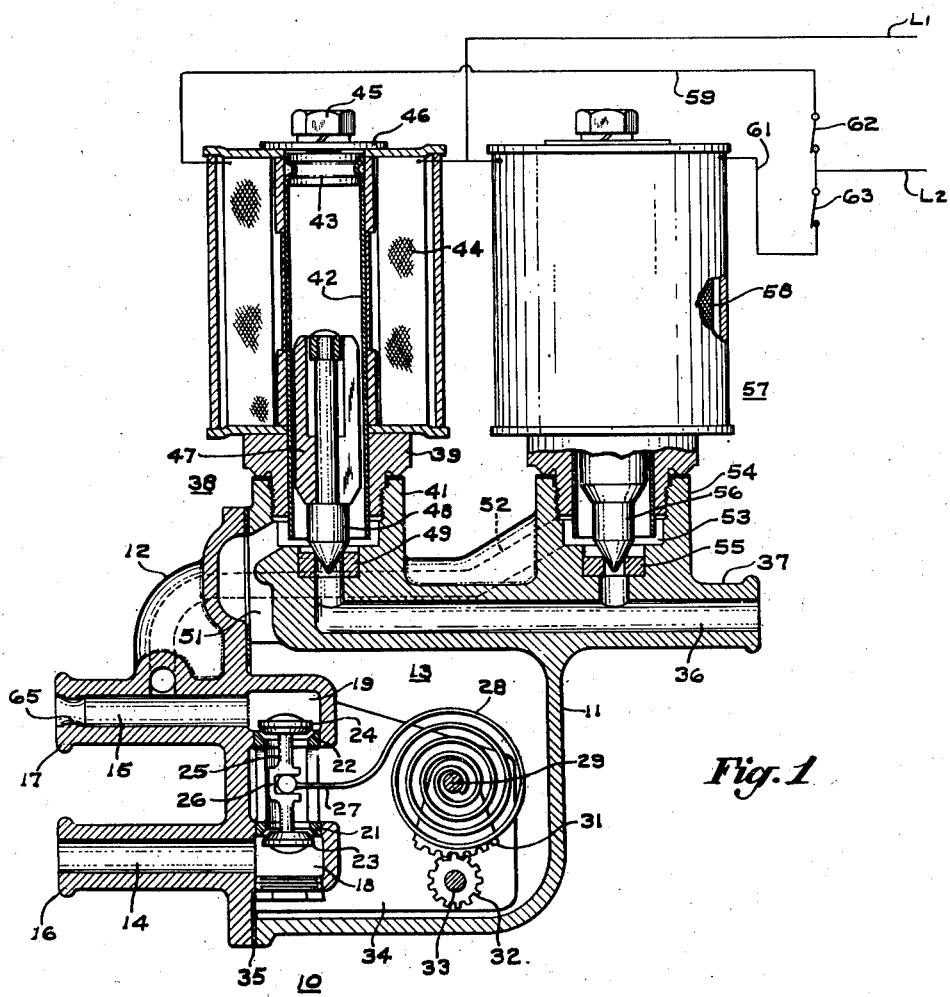
Figure 2:
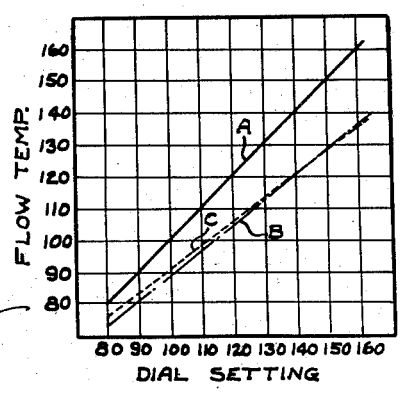

These and other objects are effected by my invention as will be apparent from the following description and claims taken in connection with the accompanying drawing, forming a part of this application, in which:

Fig. 1 of the drawing is a sectional view of a liquid mixing device constructed and arranged in accordance with my invention and including a diagrammatic showing of a control circuit associated with the electrically-operated mechanisms defining a part of the mixing device; and Fig. 2 is a chart showing temperatures of the fluid discharged from the mixing device.

Reference will now be had to the drawing wherein I have shown a liquid mixing device, generally indicated by the numeral 10, including a body structure defined by an open-ended main body portion 11 and a cover 12 for closing the open end of the main body 11. The cover 12 and the main body portion 11 enclose a mixing chamber 13 for hot and cold liquid, such as, for example, water, admitted to the mixing chamber 13 through inlet ports 14 and 15, respectively. The latter are formed in projections 16 and 17 which, preferably, are integral with the cover 12. The projections 16 and 17 may be formed for attachment to hose connections (not shown) through which water is conveyed from hot and cold sources to the device 10.

The inner ends of the inlet ports 14 and 15 terminate in valve chambers 18 and 19, respectively, the latter being provided with respective valve seats 21 and 22. Valves 23 and 24 cooperate with the valve seats 21 and 22 for regulating the passage of water from the chambers 18 and 19 to the mixing chamber 13. The valves 23 and 24 move together as a unit and, to this end, a connecting stem 25 is secured at its ends to the valves 23 and 24. A yoke portion 26 is formed on the stem 25 intermediate the valves 23 and 24 for receiving an arm 27, the latter being carried by a spiral, bimetallic element 28.

The bimetallic element 28 defines the heat-responsive member of a thermostat structure which includes a rotatable shaft 29 supporting the inner end of the bimetallic member 28, which shaft 29 is secured to a gear segment 31. The latter meshes with a pinion 32 rotatable by a shaft 33. The shafts 29 and 33 are rotatably carried by a supporting frame 34 which is secured within the mixing chamber 13 in any suitable manner. As shown, the frame 34 is carried by a shim structure 35 which is clamped between the cover 12 and the main body portion 11. The shaft 33 extends exteriorly of the chamber 13 and carries an adjusting knob or handle (not shown) by which the pinion 32 may be rotated.

It will be understood that by rotating the pinion 32 and the gear segment 31 that the bimetallic element 28 is wound or unwound and, therefore, the positions of the valves 23 and 24 relative their respective seats is changed for a given water temperature to be maintained within the chamber 13. The specific arrangement of the thermostatic element 28 and the valves 23 and 24 actuated thereby forms no part of the present invention and are shown by way of example. It will be understood that valve structures and thermal devices of other well known types may be applied equally well for proportioning the passage of hot and cold water to the chamber 13. The body structure 10 is provided with an outlet port 36 formed in the main body portion 11 and defined by a projection 37 for receiving a length of rubber hose (not shown). Passage of mixed water from the chamber 13 through the outlet 36 is controlled by an electrically-operated valve structure, generally indicated by the numeral 38. The latter includes a collar member 39 fixed within a boss 41 formed on the upper side of the main body 11, said collar member 39 having a sleeve 42 of non-magnetic material secured therein, which sleeve is hermetically closed at its upper end by a wall member, as shown at 43. Arranged exteriorly of the sleeve 42 is a winding 44 which is secured in place on the top of the collar 39 by a nut 45 and washer 46, the former being threaded on a suitable stud formed on the wall member or closure 43.

Arranged within the sleeve 42 is a magnetic core 47 which moves a valve 48 upwardly and downwardly as the winding 44 is energized and deenergized, respectively. The valve 48 cooperates with a valve seat 49 which is secured within the boss 41 adjacent the inner end of the outlet passage 36. Water from the mixing chamber 13 is conveyed to the upper side of the valve seat 49 through a passage 51, which, as shown, is defined by the cover 12 and a portion of the main body 11.

In accordance with my invention, a shunt passage 52 is formed in the body structure 10 and, as shown, is defined by complementary sections formed in the main body 11 and the cover 12. The shunt passage 52 terminates at one end in the cold water inlet port 15, and at its opposite end in a valve chamber 53 formed within a boss 54 similar in construction to the boss 41. A valve seat 55 is arranged intermediate the valve chamber 54 and the outlet passage 36 and cooperates with a valve 56 which controls the flow of cold water from the shunt passage 52 to the outlet port 36. The valve 56 defines an element of a solenoid-operated valve structure, generally indicated at 57 and including a winding 58. The construction of the valve structure 57 is similar to the solenoid-operated valve structure 38 so that no further description of the same is deemed necessary. The windings 44 and 58 are connected in electrical circuits 59 and 61 having respective switches 62 and 63 connected therein. The source of power for the windings is indicated by line conductors L1 and L2.

The liquid mixing device described heretofore is particularly adaptable for application to a washing machine which is automatically operated, that is, a machine which successively performs a predetermined program of washing and rinsing steps without manual attention. When so applied, the inlet ports 14 and 15 are connected to suitable sources of hot and cold water and the discharge port 36 is connected to the cylinder of the washing machine. The switches 62 and 63 are opened and closed in a predetermined sequence by some form of timing mechanism, driven, for example, by a synchronous motor.

During operation, the switch 62 may be closed for opening the valve 48 whereupon water from the mixing chamber 13 is discharged through the outlet port 36 for washing. At this time relatively warm water is employed, the temperature of which is determined by the setting of the bimetallic element 28. When a rinsing operation is to be effected, the temperature of the water may be reduced, mainly for the purpose of saving hot water, and, at this time, the switch 63 will be closed for energizing the magnet winding 58 and opening of the valve 56. Accordingly, the relatively warm water passed by the valve 48 is mixed with the cold water entering the outlet port 36 so that a lower temperature water is delivered at this time. Cold water may be discharged through the outlet port 36 by closing the switch 63 and opening the switch 62 whereupon only cold water is discharged through the outlet port 36, it being understood that the valve 56 is open and the valve 48 is closed.

It will be apparent from the foregoing description that three different temperatures of water may be discharged through the outlet port 36 without manually adjusting the bimetallic element 28 and that this feature is highly desirable when applied to a washing machine wherein the various steps and washing program are automatically effected.

My invention is particularly adaptable to a washing and drying machine of the type disclosed and claimed in the application of E. K. Clark and Frank Breckenridge, Serial No. 251,699, filed January 19, 1939, and assigned to the Westinghouse Electric & Manufacturing Company.

Another feature of my invention resides in reducing the differential between the temperature of the water issuing from the outlet port 36 when no water is conveyed through the passage 52 and the temperature of the water issuing through the outlet port 36 when mixed with water from the cold water passage 52 as the thermostat is adjusted to low temperature positions. This feature is best illustrated in the curve shown in Fig. 2. The solid curve A represents the temperature of the water issuing from the outlet passage 36 for different temperature positions of the thermostat and with the valve 56 closed. The broken line B indicates the temperatures of water issuing from the outlet port 36 when mixed with cold water from the passage 52 which would normally obtain if the relative amounts of water passed by the respective valves 48 and 56 were maintained substantially constant at all times and, of course, if the temperatures of the cold and hot water sources were constant.

In accordance with my invention, I propose to reduce the amount of water passed by the valve 56 relative the amount of water passed by the valve 48 in order to further reduce the difference in temperatures indicated by the curves A and B as the thermostat is adjusted to its lower temperature positions.

Accordingly, by reducing the amount of water passed by the valve 56, as set forth, the temperatures of the final mixture will follow the curve C. Therefore, the differentials as indicated by curves A and C are less for low temperature adjustments of the thermostat than the differentials defined by curves A and B.

This reduction in the amount of water passed through the passage 52 is effected by so forming the inlet port 15 on the upstream side of the junction thereof with the passage 52 that it offers a slight restriction to the flow of water through the passage 15 and effects a progressively reduced pressure in the inlet 15 as the flow of water therethrough progressively increases. Accordingly, when the thermostat is adjusted to a high temperature position, the thermostatically-operated valve 24 is closed or substantially so as, at this time, the major portion of the water admitted to the mixing chamber 13 is from the hot water inlet 14. Accordingly, the flow of water through the passage 15 and its pressure drop are relatively small so that the pressure in the passage 15 is relatively high. Therefore, when the valve 56 is opened to admit water from the passage 52, the flow through the valve will be relatively high. Accordingly, the differential as indicated by the curves A and C will be relatively high. When the thermostat is adjusted to a low temperature setting, the valve 24 will be maintained in its full-open position or substantially so as, at this time, the major portion of the water entering the mixing chamber 13 is from the cold water inlet port 15. As the flow of water in the port 15 is relatively high at this time, there will be a pressure drop therein so that, when the valve 56 is opened, the amount of water conveyed by the passage 52 and through the valve 56 will be reduced. Therefore, the cooling effect upon the water discharged from the mixing chamber 13 will be reduced and the temperature differential as indicated by the curves A and C will be reduced. The pressure reduction obtained in the inlet port 15 for different flow rates may be effected by predetermining the resistance of the port 15 or by providing a restricting orifice indicated at 65.

This feature of my invention is particularly advantageous when the mixing valve is employed with a washing and rinsing machine as a relatively large amount of cold water may be used during the rinsing operation and when the thermostat is adjusted to a high-temperature position. This amount is reduced as the thermostat is adjusted to its low-temperature positions in order that the temperature of the final mixture in the lower temperature positions of the thermostat will not be so low as to detrimentally affect the rinsing of articles washed at low temperature, such as, for example, wools.

The mixing device disclosed and claimed herein defines a distinct improvement over prior arrangements, such as that shown in said copending application, as the assembly of the thermostatic valve mechanism and the electrically-operated valves, with the shunt passage formed in the assembled structure provides a unitary structure which may be readily and economically manufactured and easily assembled in the water supply system. The number of plumbing connections is reduced to a minimum so that the cost of assembling the mixing device in the water system is substantially reduced and the possibility of water leakage is minimized. It will be apparent that the features herein set forth are highly desirable in a mixing device for the application described.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a liquid mixing device, the combination of a valve body having a mixing chamber formed therein and including first and second inlet ports terminating in said chamber for respectively conveying relatively cold and hot liquid to the chamber, first and second valves respectively controlling flow of cold and hot liquid to the chamber, adjustable means responsive to the temperature of the mixed liquid for controlling the opening and closing of said valves, said body having an outlet port formed therein for conveying the mixed liquid from the chamber, means defining a passage in said valve body for conveying cold liquid from said first inlet port to the outlet port for mixture with the liquid passed by both of said first and second valves, a valve movable only to a closed and a fully open position for controlling the flow of liquid in said passage, and means defining a restriction in a portion of said first inlet port ahead of the connection between the first inlet port and said passage, said restriction providing a progressively increasing drop in pressure in the first inlet port and said passage as the flow of fluid through the first inlet port progressively increases, whereby the relative amounts of liquid passing through said outlet port and through said passage vary as the flow of liquid in the first inlet port varies.

2. In a liquid mixing device, the combination of a body structure having a liquid mixing chamber formed therein and embodying first and second inlet ports for respectively conveying hot and cold liquid to said mixing chamber, inlet valves associated with the respective inlet ports for controlling the flow of liquid to said chamber, thermostatic means responsive to the temperature of the liquid in said chamber for actuating said valves, means defining an outlet port in said body structure for conveying liquid from the mixing chamber, a discharge valve movable only to a closed and a fully open position for controlling the passage of liquid from the mixing chamber through the outlet port, said body structure having a passage formed therein connecting one of said liquid inlet ports and the portion of the outlet port on the downstream side of the discharge valve, and a valve movable only to a closed and a fully open position for controlling the flow of liquid through said passage, said last-named valve when opened affording the passage of a predetermined quantity of liquid through said passage for mixture with the liquid discharged by said discharge valve.

3. In a liquid mixing device, the combination of a body structure having a liquid mixing chamber formed therein and embodying first and second inlet ports for respectively conveying hot and cold liquid to said mixing chamber, said body structure embodying an outlet port for conveying liquid from the mixing chamber, inlet valves associated with the respective inlet ports for controlling the flow of hot and cold liquid to the mixing chamber, means responsive to the temperature of the liquid in said chamber for opening and closing said valves, valve means movable only to a closed and fully open position and arranged within the body structure for controlling the passage of liquid from the mixing chamber through said outlet port, electrically-operated means carried by the body structure for opening and closing said valve means, said body structure having a passage formed therein providing communication between said second inlet port and said outlet port on the downstream side of said valve means, additional valve means movable only to closed and fully open positions and arranged within the body structure for controlling the flow of liquid through said passage, said additional valve means when open affording the passage of a predetermined quantity of liquid through said passage for mixture with the liquid discharged by said first mentioned valve means, and electrically-operated means for opening and closing said additional valve means.

4. In a liquid mixing device, the combination of a body structure enclosing a liquid mixing chamber and provided with first and second inlet ports for conveying hot and cold liquid to the mixing chamber, valve means associated with the first and second inlet ports for proportioning the liquid admitted thereby to the mixing chamber, a thermostat disposed within the mixing chamber and responsive to the temperature of the mixed liquid therein for actuating said valve means, means for adjusting said thermostat for varying the temperature of the liquid mixed within said chamber, said body structure having formed therein an outlet port for conveying mixed liquid from said chamber, a first valve movable only to a closed and a fully open position for controlling the passage of liquid through said outlet port, means defining a passage in said body structure connecting one of said inlet ports and the portion of said outlet port on the downstream side of said first valve, a second valve movable only to a closed and a fully open position for controlling the flow of liquid through said passage, first and second electrically-operated means for opening and closing the respective first and second valves at will, and switch means for selectively energizing and deenergizing the electrically-operated means.

FRANK BRECKENRIDGE.